Aug. 2, 1927.

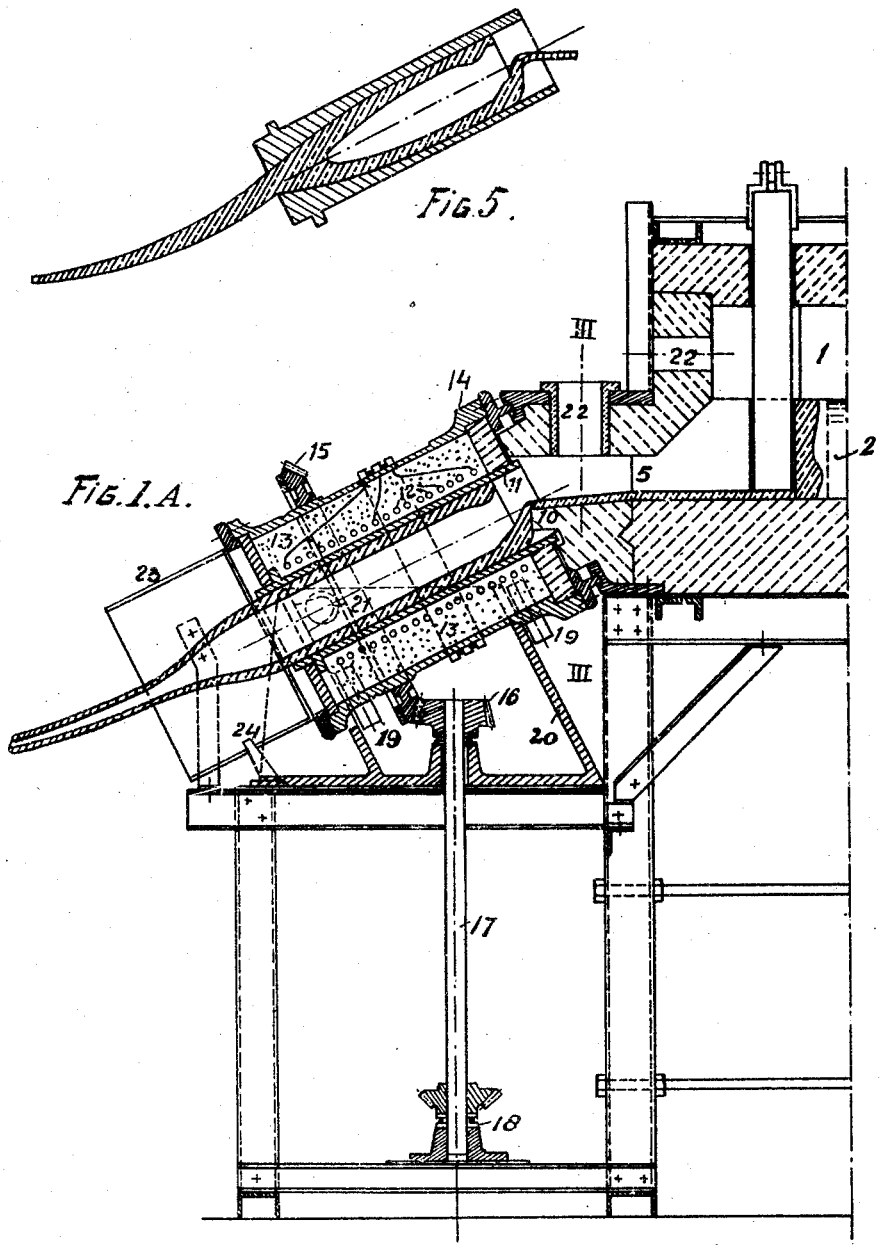

P. SCHOONENBERG 1,637,458

METHOD AND MEANS FOR THE CONTINUOUS MANUFACTURE OF GLASS TUBES OR RODS

Filed Nov. 23, 1921     4 Sheets-Sheet 3

Inventor
P. Schoonenberg
by Lawrence Langner
Atty.

Aug. 2, 1927. 1,637,458
P. SCHOONENBERG
METHOD AND MEANS FOR THE CONTINUOUS MANUFACTURE OF GLASS TUBES OR RODS
Filed Nov. 23, 1921 4 Sheets-Sheet 4

Inventor
P. Schoonenberg
by Lawrence Langner
Atty.

Patented Aug. 2, 1927.

1,637,458

UNITED STATES PATENT OFFICE.

PANCRAS SCHOONENBERG, OF EINDHOVEN, NETHERLANDS, ASSIGNOR TO NAAMLOOZE VENNOOTSCHAP PHILIPS' GLOEILAMPENFABRIEKEN, OF EINDHOVEN, NETHERLANDS, A LIMITED LIABILITY COMPANY.

METHOD AND MEANS FOR THE CONTINUOUS MANUFACTURE OF GLASS TUBES OR RODS.

Application filed November 23, 1921, Serial No. 517,413, and in the Netherlands December 2, 1920.

The invention relates to a method for the continuous manufacture of glass tubes or rods, and to a device for carrying out said method.

In a known method as employed heretofore, a stream of glass is permitted to flow on a refractory core or mandrel on which the glass is evenly distributed and from the discharge end of which the glass is drawn in cylindrical form.

As compared with such method, the present invention contemplates flowing molten glass into a hollow glass forming member inclined towards its discharge opening, distributing the glass on the inner surface of said hollow member by rotating it so that the glass flows towards the discharge opening by gravity, and always maintaining the interior of the tube out of contact with any solid during the formation of the tube, the glass being then drawn from the discharge opening of the member.

During its flow towards the discharge opening the glass layer may be heated both from the inside as well as through the wall of the said forming member, which permits of a very accurate temperature control, so that a correspondingly greater homogeneity of the glass will be obtained, which fact enables the production of glass rods or tubes of very high quality.

The apparatus for carrying out the method according to the invention, is provided with an inclined hollow rotating glass-forming member having an unobstructed interior throughout its length, means for supplying molten glass in a regulated stream into said member, and means are also provided for rotating said member at a predetermined speed for distributing the molten glass exclusively on the inner wall of said hollow member, the latter being inclined towards its discharge opening from which the molten glass may be drawn out in cylindrical form. The glass flowing on the inner surface of said member, permits supporting the hollow member very easily and satisfactorily from the outside throughout its entire length, thus reducing the risk of defect in the product due to vibration.

The accompanying drawings illustrate by way of example a device for carrying out the method according to the invention.

In the drawings:

Fig. 1ᴬ is a longitudinal section on the line I—I of Figs. 2, 3, and 4 of the molten glass chamber end of a furnace embodying the invention;

Fig. 1ᴮ is a longitudinal section on the line I—I of a furnace for the manufacture of glass tube or rod and provided with means for drawing tubes or rods according to this invention;

Fig. 5 represents a cross section of the device adapted for the drawing of glass rods.

Figure 1B:
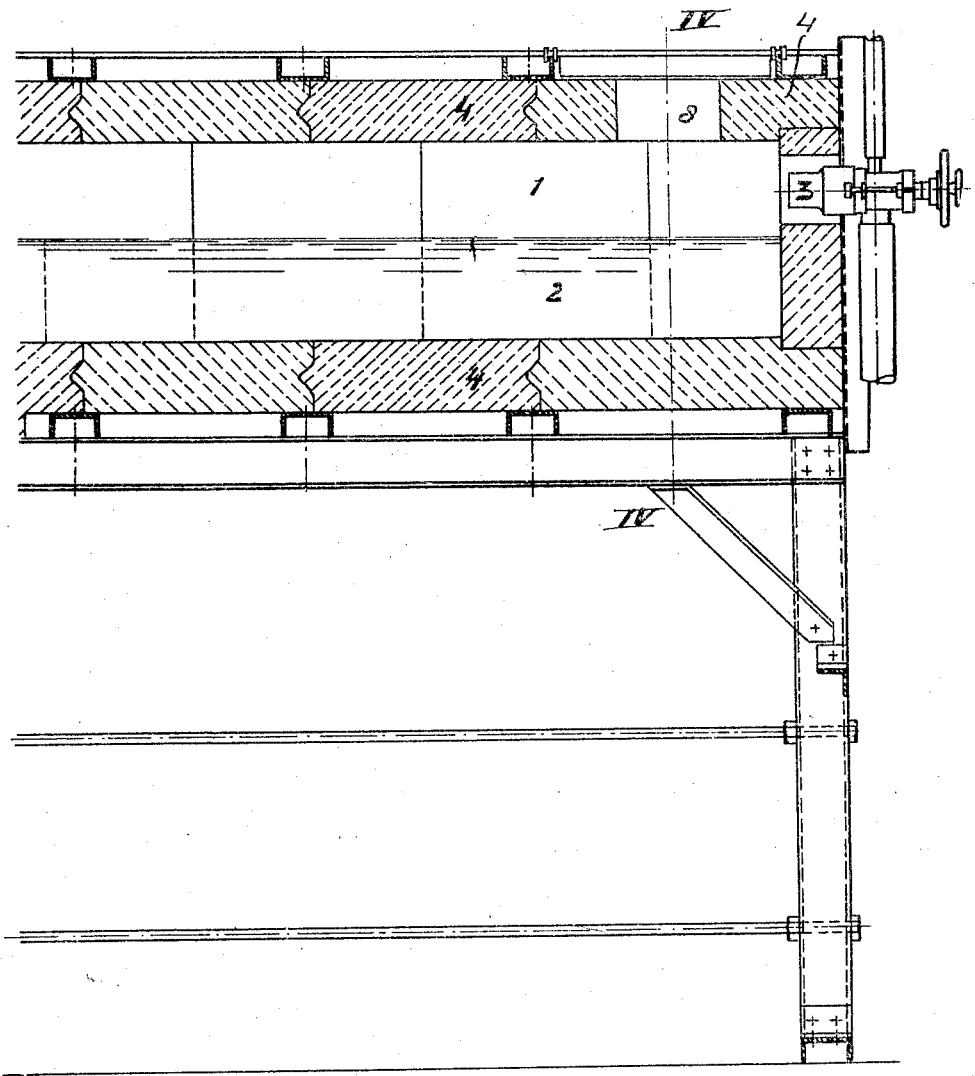
Figure 2:
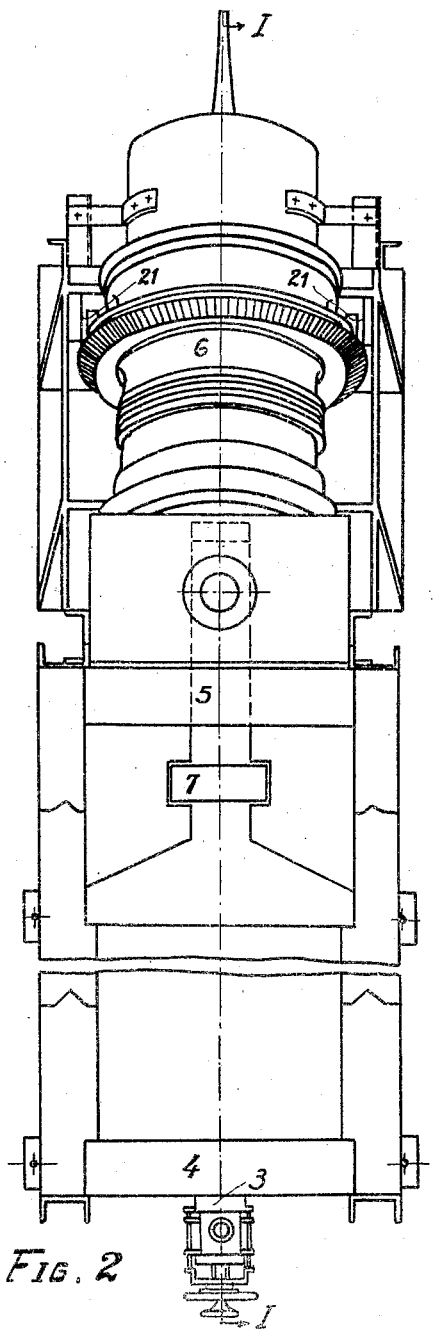
Fig. 2 is a top view of the furnace, with the cover removed.
Figure 3:
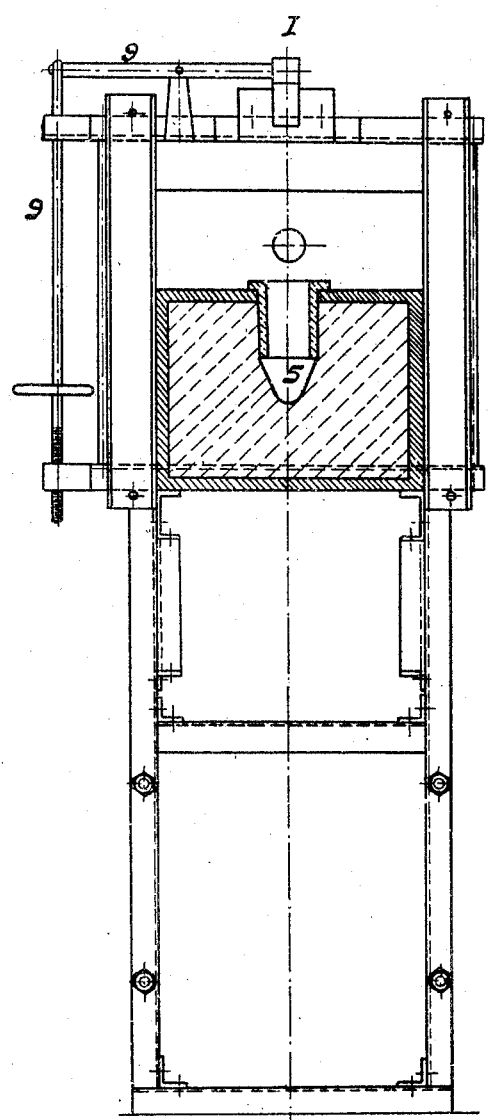
Fig. 3 is a section of the furnace on the line III—III.
Figure 4:
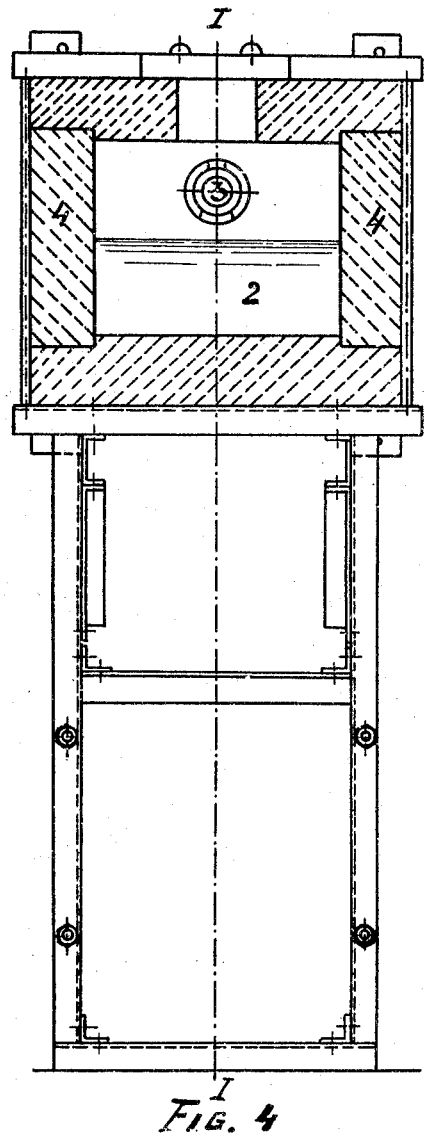
Fig. 4 is a section of the furnace on the line IV—IV.

The chamber or receptacle 1, shown in Figs. 1ᴬ and 1ᴮ, contains a quantity of molten glass 2 kept at the requisite temperature by means of a burner 3, causing the glass to remain fluid. The walls 4 of this chamber may be made of the usual refractory material. The glass is introduced into this chamber from a glass melting furnace, not shown.

Chamber 1 communicates with the drawing device according to the invention, by means of a trough lined with fire-brick.

The quantity of glass flowing from chamber 1 through this trough to the drawing device, is determined:

1. By means of the temperature of the glass in the troughs.
2. By means of the glass level.
3. By means of the supply controlling device, which (as illustrated) consists of a sliding gate 7 of suitable material, regulating the supply of molten glass from chamber 1 to the trough.

The glass level is controlled by the supply of glass from the furnace to the receptacle through the aperture 8.

The firebrick gate 7, controlling the communication between the trough and the receptacle, is guided in the upper part of the receptacle whilst its own bottom part abuts against the bottom of said receptacle. Upon lifting this gate, by means of engaging bar and lever mechanism 9, glass will flow into the trough, the quantity depending on the amount of lift of the sliding gate.

It is easily determined experimentally which size of opening between the gate and the bottom of the receptacle will be necessary to cause the right amount of glass to pass into the trough when the glass-temperature and the glass-level in the receptacle are fixed.

Upon leaving the receptacle 1 the glass flows through the trough 5 and then over an edge 10 into the drawing device, consisting principally of a hollow member 11.

In order to raise or lower the temperature of the glass during its travel from the receptacle towards the drawing device, holes 22 may be shut or opened more or less.

The longitudinal section of the hollow member 11 may be rectangular or truncated, whilst its cross section may be circular or square, in accordance with the shape and size of the glass tube or rod to be made by the device. In the drawing said hollow member is shown as a cylinder consisting of some refractory material. The member 11 has an unobstructed cross section throughout its length.

The highly heated liquid glass 2, flowing over the edge 10 into the hollow member 11, will be deposited on the inner surface of this member.

Hollow member 11 is rotated around its longitudinal axis, by means, to be described later on, fast enough and in order to cause the glass to be evenly distributed all over the inner surface of such member. By mounting the hollow member on an incline, the glass entering at the top of said member will easily flow downward and by so doing touch the entire inner surface of the cylinder.

When travelling from the top towards the bottom, the glass would cool down and consequently it might de-vitrify or even solidify were it not that means are provided to maintain a sufficiently high temperature.

This may be effected for example, by the burning of gas or by means of electrical resistance or induction heating.

In the embodiment of Fig. 1 the heating takes place by means of a heating coil of resistance material 12; heating means might also be provided in the interior of the hollow member.

In order to prevent loss of heat through radiation, the hollow member is coated by some heat insulating material 13. To this end, any of the usual materials may be used.

The outer wall of the device consists of a cylindrical shell 14, rotatably fastened to the other parts of the furnace by mechanical means.

The rotation of the drawing device may be realized by any of the well known means for doing so, e. g. gear drive, wormwheel transmission or the like; in the embodiment shown in the drawings, this rotation is effected by means of a bevelled spurwheel gearing 15 secured to said drawing device and meshing with another bevel gear 16, this latter being mounted upon the top of a vertical shaft 17, said shaft being guided and supported by a ballbearing 18, whilst said shaft is rotated by some of the well known means to do so.

The drawing device is supported by means of ballbearings 19, resting in a pedestal 20, axial thrust being taken up by ballbearing 21.

When the inner surface of the drawing device is covered with a film of liquid glass, any known form of mechanical drawing device can be employed to draw out the glass and any form of cutting device used to cut the same into lengths of the desired size. Obviously the drawing of the glass may as well be done by manual operation.

A fixed cylinder 23 surrounding the glass is provided in order to maintain the proper drawing temperature of the glass, when leaving the hollow member. This cylinder may advantageously be heated for example, by a burner 24.

It is evident from the foregoing description that the device according to the invention is adapted for the manufacture of glass tubes or glass rods with a predetermined cross section, and in continuous lengths.

In case glass tube has to be made, then, for a given diameter of the hollow member 11, a given speed of rotation thereof, and for a given speed of drawing of the glass, an increase in the supply of glass from the receptacle to the hollow member, will result in an increase of wall thickness of said tube. An increase in the speed of travel of the tube will result in a decrease of the diameter of said tube.

The dimensions may also be controlled by means of compressed air or some other means of exerting pressure.

When making glass rod, so much glass must be supplied to the hollow member, that the situation of Fig. 5 of the drawing, will approximately be realized. For this purpose and according to the invention the discharge end of the hollow member has a conical shape.

For controlling the diameter of the glass rod the same factors apply as have been mentioned for the control of the diameter of glass tube.

Having now particularly described and ascertained the nature of my said invention and in what manner the same is to be performed, I declare that what I claim to be my invention is:

1. The method of continuously drawing glass tubes which comprises permitting molten glass to flow into a hollow glass forming member inclined towards its discharge opening, causing the glass to be distributed on the inner surface of said hollow member by rotating said member so that the glass flows towards the discharge opening by gravity, and always maintaining the interior of the tube out of contact with any solid during the formation of the tube, the glass being then drawn from the discharge opening of the member.

2. The method of continuously drawing glass tubes which comprises permitting molten glass to flow into and causing it to form a layer on the inner surface of a rotating hollow glass forming member inclined towards its discharge opening, heating said layer both from the inside and through the wall of said member, always maintaining the interior of the tube out of contact with any solid during the formation of the tube, and then drawing the glass from the discharge opening of the member in cylindrical form.

3. A device for the manufacture of glass tube or glass rod comprising an elongated hollow member having an unobstructed cross-section throughout its length and inclined towards its discharge opening, said member being mounted for rotating around its longitudinal axis and on the inner wall of which molten glass is permitted to flow and be exclusively distributed, and lengthwise from which member it may be drawn in cylindrical form, and means for rotating said hollow member at a predetermined speed.

4. A device for the manufacture of glass tube or glass rod comprising an inclined hollow rotating glass forming member having an unobstructed interior throughout its length, means for supplying molten glass in a regulated stream into said member, means for rotating said hollow member at a predetermined speed for distributing molten glass exclusively on the inner wall of said hollow member, the latter being inclined towards its discharge opening from which the molten glass may be drawn out in cylindrical form.

5. A device for the manufacture of glass tube or glass rod comprising a hollow glass forming member inclined towards its discharge opening and mounted for rotation around its longitudinal axis, means for imparting to said member a rotary motion at a predetermined speed, means for supplying molten glass in a regulated stream to the inside of said hollow member and distributing the molten glass exclusively on the inner wall thereof, means for keeping the glass in the hollow member at the proper temperature, a stationary shell extending from and in line with the hollow member, and means for heating the shell.

6. A device of the class described comprising a hollow glass forming member having an unobstructed interior throughout its length, inclined towards its discharge end and rotatable around its longitudinal axis; means for rotating the member at a predetermined speed; means for supplying molten glass in a regulated stream to the inner surface of said member at its upper end, so that due to the rotation of the member and the force of gravity incident to the inclination of the member, a cylinder of glass is formed exclusively on the inner wall of the member, and which cylinder may be drawn from the discharge end of the member.

In testimony whereof I affix my signature.

PANCRAS SCHOONENBERG.